No. 856,600. PATENTED JUNE 11, 1907.
E. W. PARKER.
PHOTOGRAPHIC SHUTTER.
APPLICATION FILED NOV. 26, 1904.
3 SHEETS—SHEET 1.
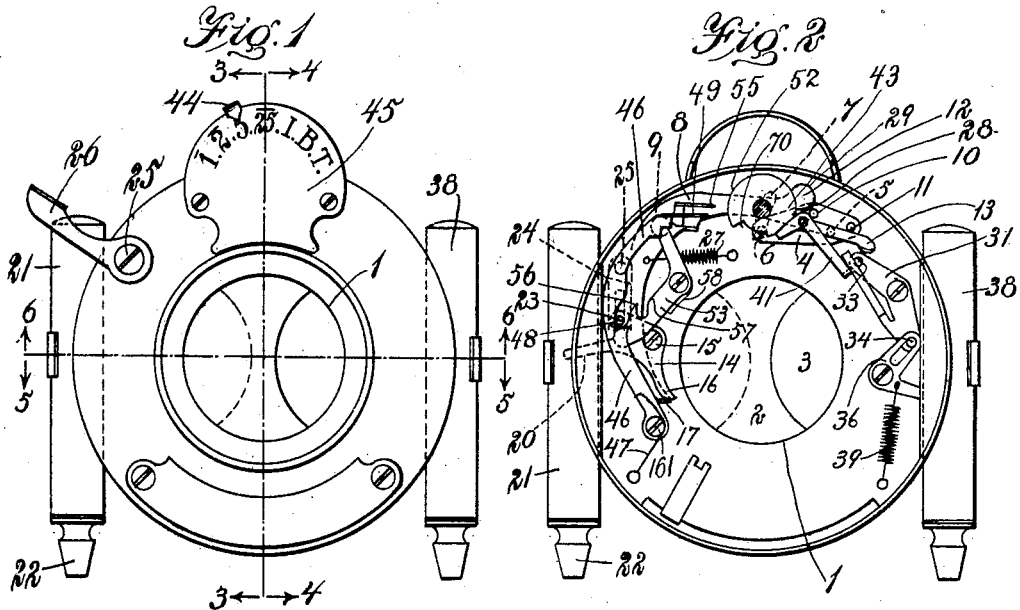

No. 856,600. PATENTED JUNE 11, 1907.
E. W. PARKER.
PHOTOGRAPHIC SHUTTER.
APPLICATION FILED NOV. 26, 1904.
3 SHEETS—SHEET 2.
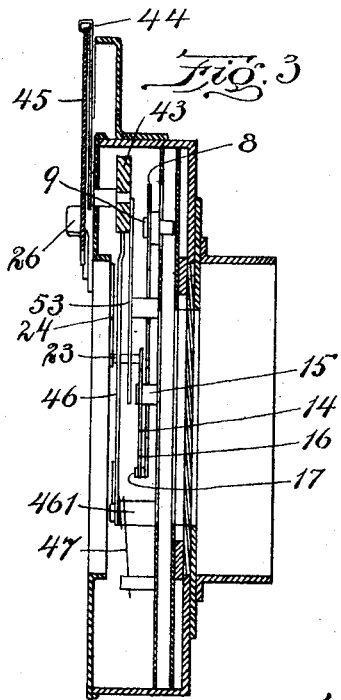
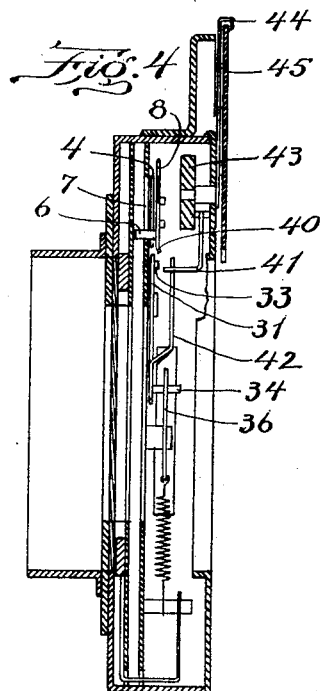
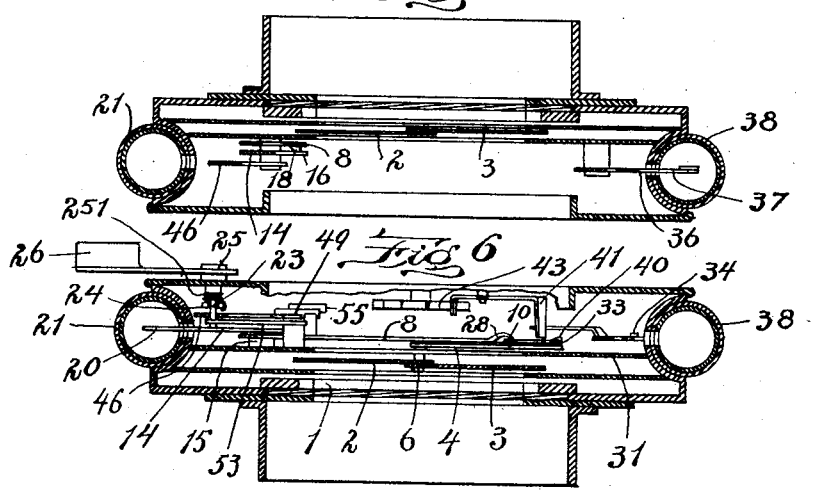
Witnesses:
P. W. Pezzetti
L. E. Kennedy
Inventor:
E. W. Parker
by
Wright, Brown, &c.
Attorneys.

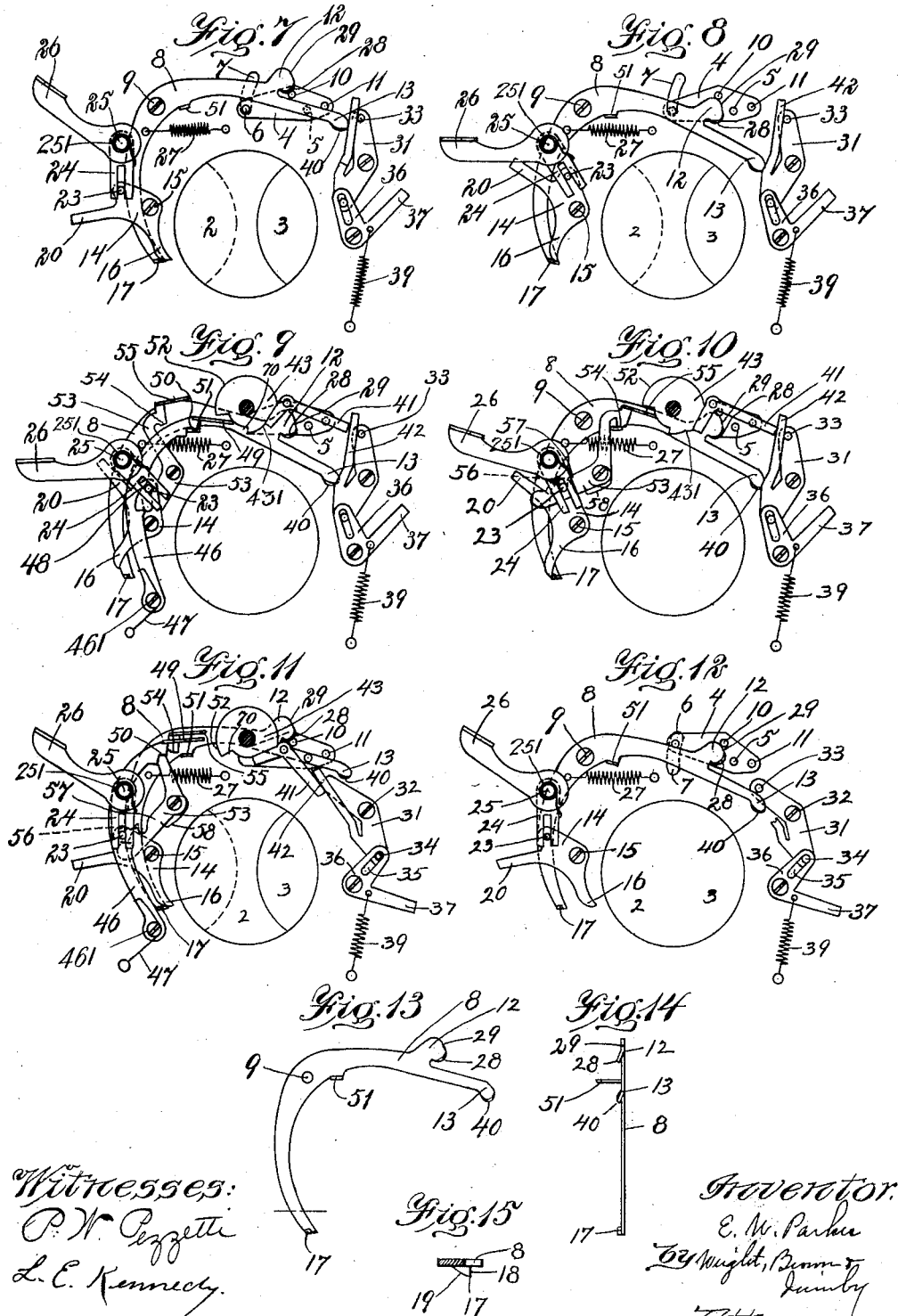

UNITED STATES PATENT OFFICE.

EDWIN W. PARKER, OF ROCHESTER, NEW YORK.

PHOTOGRAPHIC SHUTTER.

No. 856,600.  Specification of Letters Patent.  Patented June 11, 1907.

Application filed November 26, 1904. Serial No. 234,381.

*To all whom it may concern:*

Be it known that I, EDWIN W. PARKER, of Rochester, in the county of Monroe and State of New York, have invented certain new and useful Improvements in Photographic Shutters, of which the following is a specification.

The present invention relates to shutters for photographic cameras and has for its object to provide a device of this character having novel and improved operating mechanism by which the shutter may be caused to open and close more rapidly than is the case with devices of this character now in use and with entire absence of objectionable vibration.

A further object is to provide novel mechanism by which the operation of the shutter may be retarded to cause it to remain open for a greater or less length of time, and mechanism for positively holding the shutter open for as long a time as may be desired by the operator.

The invention consists in the apparatus which I will now proceed to describe and claim.

Of the accompanying drawings,—Figure 1 represents an elevation of a photographic shutter embodying my invention. Fig. 2 represents a similar view of the same with the cover of the casing removed. Fig. 3 represents a section on line 3—3 of Fig. 1, looking toward the left, the shutter leaves being removed. Fig. 4 represents a section on the same line, looking toward the right, the shutter leaves being removed. Fig. 5 represents a section taken on the horizontal diametrical line 5—5, looking downward. Fig. 6 represents a section on the same line, looking upward. Fig. 7 represents a view similar to Fig. 2, but showing only the mechanism essential for operating the shutter, the said mechanism being in the normal position occupied when the shutter is closed. Fig. 8 represents a view similar to Fig. 7, showing the same mechanism as displaced preliminary to opening the shutter aperture. Fig. 9 represents a similar view, showing the mechanism illustrated in the previous figure in the position occupied when the shutter is open and showing also a locking device adapted to hold the shutter open as long as pressure is maintained on an operating-bulb or trigger and a lock for retaining the shutter open for time exposure. Fig. 10 shows the same mechanism with the first locking device omitted to show the additional locking member for holding the shutter open for a time-exposure more clearly. Figs. 11 and 12 represent views showing the positions of said mechanism when the shutter is respectively closed and open, and illustrating the action of a retarding device which acts to hold the shutter open for a limited time. Figs. 13 and 14 represent elevations taken at right angles to each other of the main operating lever for the shutter. Fig. 15 represents a sectional view, enlarged, of the lower end of the main lever. Fig. 16 represents a perspective view of the lever which controls the retarding device.

The same reference characters indicate the same parts in all the figures.

The light-admitting aperture 1 is adapted to be closed in the usual manner by shutter-blades 2 3 of any usual construction arranged to be separated to open the aperture and to be brought together and overlapped to cause closing of the same. The shutter-blades are formed of any usual construction having over-lapping slotted portions and are operated by an opening lever 4 which is pivoted at 5 to the base-plate of the shutter and has a stud 6 projecting through a slot 7 in said base-plate and engaging the cam-slots in the overlapping portions of the shutter-blades. The arrangement is such that as the stud 6 is moved toward the upper portion of the device the shutter-blades are separated to open the aperture 1 and as it is moved in the opposite direction the blades are brought together again to close the aperture.

A member 8 which I will call for convenience hereafter the "main lever" is provided for operating the opening lever and is arranged so that it causes both the opening and closing of the shutter-blades during a single movement in one direction by the means to be now described. This main lever is fulcrumed at 9 to the base-plate of the apparatus and overlies a portion of the opening lever 4. The latter is provided with studs 10 11 located on different sides of the pivot 5, and the main lever has projecting portions 12 13 arranged to co-operate with said studs. A member which I will call the "operating lever" 14 fulcrumed at 15 has a downwardly-extending arm 16, the end of which engages a lug 17 extending from the lower end of the main lever. The lug has a square shoulder 18 located in position to be engaged by the arm 16 as the latter is moved toward the left and a sloping surface 19 upon its opposite side, as shown in Fig. 15. An arm 20 formed on the operating lever 14 extends into the pump barrel 21 and is connected therein to a plunger adapted to move up and down in the barrel in the manner usual in devices of this character. A bulb may be attached in the usual way to a nozzle 22 extending from an end of the barrel. A pin 23 is also mounted upon the operating lever and is engaged by a forked arm or trigger extension 24 attached to a stud 25 which is rotatably mounted in the cover of the shutter-casing and to which is connected a trigger 26 adapted to be engaged by the finger of the operator. Thus the operating lever may either be moved by the finger of the operator or by air pressure produced by squeezing a bulb. When thus operated, either by pressing down on the trigger 26 or forcing air into the barrel 21 to raise the plunger contained therein, the operating lever is rotated upon its pivot, moving the arm 16 to the left, the latter engaging the square shoulder 18 of lug 17, and carrying with it the lower end of the main lever in the same direction. As the arm 16 is shorter than the lower arm of the main lever, the end of the former arm will slip by the lug 17 after it has proceeded a certain distance and the main lever will then be free to be returned to its original and normal position by a spring 27 connected at one end to the said lever and at the other to a fixed abutment. The operating lever on being released will return to its original position under the influence of a spring 251 mounted upon the stud 25 engaging the trigger-extension 24, tending to move it to the left, and the arm 16 will ride over the inclined surface 19 of lug 17 and will finally drop back into place at the right of said lug. The levers being made of resilient metal will yield sufficiently to permit one to ride over the other in the manner indicated.

The projection 12 has a portion of its edge adjacent the stud 10 turned up to form a projecting lip 28, and the portion of the stud 10 adjacent said lip is beveled so that as the projection is moved downward by the actuation of the operating lever the projection 12 will ride up over the stud and slip back upon its other side. The length of arm 16 and its relation to the lug 17 is such that it will remain in engagement with said lug for a distance sufficient to cause the projection 12 to move over and by the stud 10, after which it releases the main lever and allows it to be returned to its original position or retracted by the spring 27. During this motion the cam surface 29 of projection 12 engages the under side of stud 10 and raises the latter, moving the opening lever in right-handed rotation about its fulcrum and raising stud 6 to cause separation of the shutter-blades, the end of the projection slipping by the stud as soon as the latter has been moved sufficiently to cause the complete opening of the blades, this position being illustrated in Fig. 12. After the projection 12 has passed by stud 10 and released the same, the second extension 13 on the main lever engages stud 11 on the other side of the fulcrum of the opening lever and moves the latter in the opposite direction to close the blades of the shutter.

With the mechanism just described, a practically instantaneous opening and closing of the shutter will be caused, for the latter will not be operated by the main lever except during its rapid return motion under the influence of spring 27. Thus the studs 10 and 11 will be engaged in quick succession and will be rapidly moved first in one and then in the other direction. From the foregoing it will be seen that my invention comprises broadly an operating arm or lever arranged to both open and close the aperture of the shutter during a single movement in one direction and a single spring adapted by a pull in one direction to accomplish this result by acting on the lever. Hitherto photographic shutters generally have used two springs, one of which works in opposition to the other, requiring that one of the springs be comparatively stiff, and also impeding the action. By arranging the parts so that one spring does all the work, I am enabled to get greater speed and at the same time easier action, with less jar. By being operated in this manner, the shutter-blades are caused to separate and move together again smoothly and without vibration or jar tending to disturb the clearness of the image made upon the sensitive surface.

In order to cause the aperture 1 to remain open for an appreciable interval of time after the shutter-blades have been separated by the action of the main lever, a retarding device is provided for engaging a portion of the main lever after the projection 12 has moved the stud 10 to open the shutter and hold back the same before allowing projection 13 to engage stud 11. This device is illustrated particularly in Figs. 11 and 12 and consists essentially of an arm or lever 31, which for convenience I call the "retarding lever" pivoted at 32 to the base-plate and having a stud 33 projecting therefrom into the path of motion of the projection 13 of the main lever. A portion of the retarding lever, such as a pin or stud 34 mounted thereon extends into a slot 35 of a bell-crank lever 36, which I may call the "speed-controlling lever." The latter has an arm 37 extending into a barrel or chamber 38 containing air or other fluid in which is mounted a movable piston, said arm being engaged with said piston. A spring 39 connected to the speed-controlling lever and a fixed abutment tends to turn the said lever toward the right and retain stud 33 in the path of motion of the projection 13. The latter on its side adjacent the aforesaid projection has an upturned lip 40 which is formed to ride over the stud 33 when the lever is being moved into its operative position.

After the projection 13 has passed by the stud 33 and projection 12 has passed by stud 10, the lever by its resiliency slips back into the plane of these studs into position to engage them on its return stroke. The position of these parts shortly after the commencement of the return stroke of the main lever is shown in Fig. 12. As soon as the main lever has been moved far enough to cause the complete opening of the shutter-blades, it comes into contact with the stud 33 and as this contact portion is formed as an inclined cam surface, it acts to move the stud to the right, thus elevating the arm 37 and the plunger connected thereto against the resistance of the fluid contained in the chamber 38. The latter interposing a resistance of constant force against the yielding pressure of the spring 27 prevents the rapid motion of the lever which said spring tends to produce.

A device for moving the stud 33 out of the way of projection 13 consists of a pivoted arm or bell-crank lever 41 engaging a projection 42 on the retarding lever and having an arm resting against a cam portion 431 of a circular disk 43. The latter is provided with an arm 44 by which it may be turned and the arm has a pointer which indicates figures on a fixed dial 45. By shifting the disk the stud 33 may be moved out of the path of projection 13 or it may be allowed to extend into the said path to any desired extent under the influence of the spring 39. The distance which it projects into this path governs the length of time it remains in contact with the said projection and so the length of time the shutter remains open. The figures on the dial may be made to represent the periods of time, such as fractions of a second, by which the operating projection 13 is retarded by the stud with various positions of the cam.

Fig. 9 illustrates more particularly a device which is provided to cause the shutter to remain open as long as pressure on the operating bulb is maintained or as long as the trigger 26 is held depressed. This device consists of an arm 46 pivoted at 461 which tends to move always about its pivot to the right under the influence of a spring 47, but is restrained from such movement by the stud 23 on the operating lever against which an inclined cam surface 48 of the said arm bears. A shoulder 50 is formed upon a portion of this arm and is adapted to engage against a lug 51 extending from a portion of the main lever 8. Ordinarily engagement between this shoulder and lug is prevented by means of the periphery 52 of the disk 43 which is interposed in the path of the free end 49 of the arm and prevents it moving a sufficient distance to the right to permit the shoulder to extend into the path of movement of the lug. When, however, the arm 44 is moved sufficiently to bring its end in alinement with the letter "B" on the scale before referred to, a recess 70 formed in the edge of the disk is moved into proximity with the end of the arm, whereby the latter is permitted to move sufficiently far to bring its shoulder 50 into line with the lug 51. The operation of this part of the device is as follows: When the operating lever is moved either by the trigger or by the bulb, the pin 23 is moved in a general direction toward the right, permitting the arm 46 to be moved in the same direction by its spring 47. By the time the operating lever has been moved far enough to release the end of the main lever after having displaced it, the arm 46 has advanced far enough to extend its shoulder in line with the lug 51 so that as soon as the operating lever is released, its lug comes into engagement with said shoulder, the parts being positioned so that these parts engage and the main lever is arrested immediately after its projection 12 has engaged and operated the stud 10 of the opening lever to separate the shutter-blades and uncover the aperture of the shutter. As soon as the pressure on the trigger or on the bulb is released, pin 23 is moved to the left and acting upon the cam surface 48 of arm 46 moves the latter out of the path of lug 51, thus permitting the main lever to continue its return stroke and to engage stud 11 of the opening lever to close the shutter. The lever 53 is provided for locking the main lever in the position shown in Figs. 9 and 10 for an indefinite time or until the trigger or bulb is again operated to cause release of the main lever. This lever 53 is provided with a shoulder 54 adapted to move into the path of movement of the lug 51, a projection 55 formed to engage the flange 52 of cam 43, a hook 56 to lock against stud 23 and a cam surface 57 arranged to be operated by the said stud to move the shoulder 54 out of engagement with stud 51. A spring 58 tends to move the lower arm of this lever toward the stud 23 and hold the cam surface 57 in engagement therewith. When the cam 43 is turned into its extreme position, illustrated in Fig. 10, so that the arm 44 is in line with the mark "T" on the dial, the recess 70 of the disks is in line with the projecting end 54 of this lever and the latter is then free to be operated. In all other positions of the disk, however, the said lever is rendered inoperative. The disk being in the position shown in Fig. 10, however, upon movement of the operating lever 14 in the direction to bring the main lever into its operative position, the lever 53 which I will call the "time lever" is permitted to move under the influence of its spring 58 to advance its shoulder 54 into line with the lug 51, engaging said lug after the main lever has commenced its return movement and has opened the shutter-blades. The hook 56 is then in the path of the pin 23 and engages the latter to resist its retractive movement before the arm 16 on its return has slipped by the inclined surface 19 into position to engage the square shoulder of the lug 17 on the main lever. Thus the parts remain locked with the shutter-aperture open. On the next depression of the trigger or operation of the bulb, the pin 23 is caused to engage the cam surface 57 and move the latter to the right, thus withdrawing the shoulder 54 from engagement with the lug 51 and permitting the main lever to continue its interrupted return movement, causing its projection 13 to engage the stud 11 and close the shutter-blades. In completing its movement the main lever carries its lug 51 by the corner of the shoulder 54, thereby holding the time lever out of operative position and permitting the operating lever 14 to return to its original position ready to again actuate the parts when required. At the time when the operating lever releases the main lever the pin 23 is in engagement with the most extended portion of the cam surface 57 and the shoulder 54 is then out of line with the lug 51, and if no means were provided for stopping the motion of the main lever it would complete its return movement before the shoulder 54 could be moved to engage the lug 51 as the pin 23 is retracted. The arm 46, however, acts to engage the lug while the shoulder 54 of the time lever is temporarily out of action, for it is permitted to advance as previously described successively as pin 23 is advanced. When the latter, however, begins to retract, it at the same time permits the shoulder 54 to move in line with the lug 51 and the shoulder 50 of the arm 46 to be moved away therefrom and the main lever is then held solely by the shoulder 54.

The location of the cam projection 52 relative to that part of the cam which operates the lever 41 to displace the retarding mechanism is such that when either of the locking members projects to hold the main lever stationary and prevent its closing the shutter-blades, the retarding device is moved out of the way of the end of the main lever. Conversely, when cam 43 is moved so as to permit the retarding device to extend into the path of motion of projection 13 of the main lever, the cam projection 52 is then in such a position as to hold both of the locking arms 46 and 53 in inoperative position. Further both the yielding retarding device and the positive locking members may be out of operative position so that the action of the shutter may be instantaneous.

I claim:—

1. In a photographic shutter, a lever arranged to open and close the light-admitting aperture of the shutter by movements in opposite directions of rotation, and a member arranged to engage said lever on opposite sides of its fulcrum during a movement in one direction to move the lever first in one and then in the other direction.

2. In a photographic shutter, a lever, means for advancing said lever, means for returning the same to its original position, and a pivoted arm having connections for opening and closing the shutter by movement in opposite directions, the lever being arranged to engage the arm first on one and then on the other side of its pivot to move the same in opposite directions by a single movement in one direction.

3. In a photographic shutter, a lever, means for advancing and automatically releasing said lever, and means for returning the same to its original position, the lever being arranged to both open and close the light-admitting aperture of the shutter during its return movement.

4. A photographic shutter comprising means adapted to extend over the light-admitting aperture, an opening lever engaged with said means to operate the same, and a main lever formed and arranged to engage said opening lever on opposite sides of its fulcrum to move the latter in opposite directions, and thereby operate said means to open and close the aperture of the shutter, by a single movement in one direction.

5. A photographic shutter having an aperture, light-excluding means adapted to extend across the aperture, an opening lever engaged with said means to withdraw the same by a movement in one direction and advance the same across the aperture by a movement in the opposite direction, and a main lever formed with projections arranged to engage the said opening lever first on one side of its fulcrum and then on the other during a single movement in one direction to oscillate the opening lever and thereby retract and advance the light-excluding means to open and close the aperture.

6. A photographic shutter having an aperture, light-excluding means adapted to extend across the aperture, an opening lever engaged with said means to withdraw the same by a movement in one direction and advance the same across the aperture by a movement in the opposite direction, projections formed on said opening lever on opposite sides of its fulcrum, and a main lever having a projection arranged to engage one of said projections to move the opening lever in the direction to withdraw said means, and having a second projection arranged to subsequently engage another projection on the opening lever to move the latter in the opposite direction during a single movement in one direction of the main lever.

7. A photographic shutter comprising shutter-blades, a lever engaged with said blades and adapted to be oscillated to open and close said blades, projecting studs mounted on said lever on opposite sides of its fulcrum, a main lever overlying said opening lever, means for advancing and for retracting said main lever, the main lever being formed with a cam projection having an upturned edge adapted to ride over one of said studs on its advancing movement and formed to engage said stud on its return movement to move the latter and the opening lever in a direction to open the shutter-blades, the projection being of such length as to cause it to slip by said stud after the opening lever has been fully turned, and a second projection formed on the main lever arranged to engage the second stud on said opening lever after the first projection has passed by the first stud.

8. A photographic shutter having an aperture, light-excluding means adapted to extend over the aperture, connections arranged to move said means in opposite directions to open and close the aperture, and a single spring connected to operate said connections.

9. A photographic shutter having an aperture, light-excluding means adapted to extend over the aperture, connections constructed and arranged to operate said means to open and close the aperture, a single spring arranged to operate said connections by exerting a pull in one direction, and means for moving said connections in a direction to put said spring under tension and tripping the connections by a single movement.

10. A photographic shutter having an aperture, light-excluding means adapted to extend over the aperture, connections constructed and arranged to operate said means first in one and then in the opposite direction to open and close the aperture, a single spring arranged to operate said connections by exerting a pull in one direction, and separate mechanism for putting said spring under tension.

11. A photographic shutter having an aperture, light-excluding means adapted to extend over the aperture, a member arranged to operate said means to open and close the aperture, a single spring engaged with said member and arranged to move the latter to open and close the aperture, and mechanism for putting said spring under tension and releasing said member by a single movement.

12. A photographic shutter having an aperture, oscillating light-excluding means adapted to extend over the aperture, a movable member connected to operate said means, a spring engaged with said member arranged to move the same in one direction for oscillating the light-excluding means each in two opposite directions to both open and close the same, and separate mechanism for moving the said member in the opposite direction to put said member in operative position and place the spring under tension.

13. A photographic shutter having an aperture, light-excluding means adapted to close the aperture, a main lever connected to operate said means in opposite directions to both open and close said means, and an operating and tripping member mounted to engage said main lever to move the same in one direction.

14. A photographic shutter having an aperture, light-excluding means adapted to close the aperture, a main lever connected to operate said means in opposite directions to both open and close said means, an operating lever mounted to engage said main lever to move the same in one direction, and means for returning the main lever to its original position.

15. A photographic shutter having an aperture, light-excluding means adapted to close the aperture, a main lever connected to operate said means, an operating lever mounted to engage said main lever to move the same in one direction, and means for returning the main lever to its original position, the main lever being arranged to operate the light-excluding means both to open and close the aperture on its return movement.

16. A photographic shutter comprising means adapted to cover the aperture of the shutter, a main lever arranged to operate said means in opposite directions to both open and close the same and having a projecting lug, an operating lever having an arm arranged to engage said lug to move the main lever in one direction, and yielding means connected to said main lever for moving it in the opposite direction.

17. A photographic shutter comprising light-excluding members, a main lever formed with a projecting lug having a shoulder on one side and an inclined surface on the other, an operating lever provided with an arm arranged to engage the shoulder on said lug to move the main lever when rotated in one direction and formed of such a length as to slip by said shoulder when turned a predetermined distance and adapted to ride over the inclined surface of said lug in returning to its original position, yielding means for returning said main lever to its original position, and connections arranged to be operated by said main lever in its returning movement to both open and close said light-excluding members.

18. A photographic shutter comprising light-excluding members, an opening and closing device engaged therewith, a main lever having portions arranged to engage said device to open and close said members during its movement in one direction, means adapted to act with a uniform force on said lever to move the latter in a direction to engage said device, and a retarding device arranged to engage a portion of said main lever and resist the pressure of said means.

19. A photographic shutter comprising light-excluding members, an opening and closing device engaged therewith, a main lever having portions arranged to engage said device to open and close said members during its movement in one direction, means adapted to act with a uniform force on said lever to move the latter in a direction to engage said device, and a retarding device comprising a movable projection mounted to extend into the path of a portion of said main lever and be engaged thereby, and means connected to said projection adapted to exert a uniform resistance to movement of the lever.

20. In a photographic shutter having an actuator for both opening and closing the light-admitting orifice thereof by a single movement in one direction, means for retarding the action of said actuator comprising a projecting member arranged to extend into the path of motion of a portion of said actuator, and a yielding member connected to said projecting member and adapted to resist movement of the latter.

21. In a photographic shutter having an actuator for both opening and closing the light-admitting orifice thereof by a single movement in one direction, means for retarding the action of said actuator comprising a projecting member arranged to extend into the path of motion of a portion of said actuator, and means adapted to exert a resistance of uniform force connected to said projecting member.

22. In a photographic shutter having an actuator for both opening and closing the light-admitting orifice thereof by a single movement in one direction, means for retarding the action of said actuator comprising a projecting member arranged to extend into the path of motion of a portion of said actuator, a chamber containing fluid, a plunger movable in said chamber, its motion being resisted by the fluid contained therein, and connections between said plunger and said projecting member.

23. In a photographic shutter having mechanism for opening and closing the light-admitting orifice thereof, means for retarding the action of said mechanism comprising a projecting member arranged to extend into the path of motion of a portion of said mechanism, a yielding member connected to said projecting member and adapted to resist movement of the latter, and means for rendering said retarding device inoperative.

24. In a photographic shutter having mechanism for opening and closing the light-admitting orifice thereof, means for retarding the action of said mechanism comprising a projecting member arranged to extend into the path of motion of a portion of said mechanism, a yielding member connected to said projecting member and adapted to resist movement of the latter, an arm pivoted to engage a portion of said retarding means, and a cam adapted to engage said arm, whereby the latter may be actuated to move the projecting member out of the path of the shutter-operating mechanism.

25. In a photographic shutter, a main lever adapted to open and close the light-admitting aperture of the shutter by a single movement in one direction, and mechanism for retarding the action of said lever comprising a member having a projection extended into the path of motion of a portion of the lever and positioned to be engaged by the latter after it has opened the aperture and before it has closed the same, and yielding means connected to said member to resist movement thereof.

26. A photographic shutter having a light-admitting aperture, members adapted to close said aperture, a main lever arranged to actuate said members by a single movement in one direction to open and close the aperture, a retarding device for delaying the closing of the aperture comprising a projection arranged to extend into the path of motion of a portion of said main lever and be engaged by the same after it has caused the opening and before causing the closing of the aperture, and a member adapted to offer a constant resistance connected to said projection, thereby resisting the pressure of the main lever tending to move the projection out of its path, positive means arranged to move the projection away from said main lever, and yielding means tending to move the projection toward the main lever.

27. A photographic shutter having a light-admitting aperture, means for closing said aperture, an actuator for said means arranged to cause the latter both to open and close the aperture, manually-controlled connections displaceable to operate said actuator, and means independently movable into position to engage said actuator for retaining the aperture open while said operating connections are displaced.

28. A photographic shutter having a light-admitting aperture, means for closing said aperture, an actuator for said means arranged to cause the latter both to open and close the aperture, manually-controlled connections displaceable to operate said actuator, independent means governed by said connections for retaining the aperture open while said operating connections are displaced, and a stop independent of said connections movable into and out of position to render said retaining means inoperative.

29. A photographic shutter having a light-admitting aperture, means for closing said aperture, an actuator for said means arranged to cause the latter to open and close the aperture, manually-controlled operating connections for said actuator, independent means controlled by said manually-controlled operating connections adapted to retain the aperture open while said connections are displaced, a yielding member tending to move and hold said independent means into position for holding open the aperture-closing means, and a displaceable stop adapted to hold said independent means out of such position.

30. A photographic shutter having a light-admitting aperture, means for closing said aperture, an actuator arranged by a single movement in one direction to operate said means to cause both the opening and closing of said aperture, manually-controlled means connected to operate said actuator by a movement in one direction, and means arranged to move independently into position to engage said actuator and maintain the aperture open while said manually-controlled means is displaced.

31. A photographic shutter having a light-admitting aperture, means for closing said aperture, an actuator arranged by a single movement in one direction to operate said means to cause both the opening and closing of said aperture, manually-controlled means connected to operate said actuator by a movement in one direction, and means arranged to maintain the aperture open while said manually-controlled means is displaced, comprising a member under the control of said manually-controlled means constructed and arranged to move independently and automatically into position to engage and hold the actuator after it has caused the opening and before it has caused the closing of said aperture-closing means.

32. A photographic shutter having an aperture, means adapted to extend over and close said aperture, a lever having portions arranged to operate said means by a movement in one direction to both open and close said aperture, a manually-controlled member arranged to displace said lever, yielding means connected to said lever to return the same to its original position, the lever being adapted to operate the aperture-closing means on its return motion, a movable member having a projection, yielding means tending to move said projection into position to engage a portion of the lever, and a projection on said manually-controlled member arranged to engage said movable member and move it away from the lever.

33. A photographic shutter having an aperture, means adapted to extend over and close said aperture, a lever having portions arranged to operate said means by a movement in one direction to both open and close said aperture, a manually-controlled member arranged to displace said lever, yielding means connected to said lever to return the same to its original position, the lever being adapted to operate the aperture-closing means on its return motion, a movable member having a projection, yielding means tending to move said projection into position to engage a portion of the lever, a projection on said manually-controlled member arranged to engage said movable member and move it away from the lever, and an auxiliary movable piece arranged to engage said movable member and hold it away from said lever.

34. A photographic shutter comprising a main lever, a manually-controlled operating lever having a portion arranged to engage and displace said main lever and to release the same after displacing it by a predetermined amount, yielding means connected to the main lever for returning it to its original position, mechanism for opening and closing the light-admitting opening of the shutter, projections on the main lever arranged to engage and operate said mechanism on its return movement to both open and close said aperture, a lug mounted on said lever, a movable arm having a projection adapted to engage said lug and arrest the motion of the main lever after it has caused the opening of the aperture-closing mechanism, yielding means connected to said arm tending to move the projection on the latter into position to engage the lug, and a projection on the manually-controlled operating lever adapted to engage a portion of the arm.

35. A photographic shutter comprising mechanism adapted to close the light-admitting aperture thereof, an actuator therefor, manually-controlled means for operating said actuator, and means rendered operative by one actuation of said manually-controlled means to lock said actuator to hold the aperture-closing mechanism open, and caused to release said actuator to permit the latter to positively close said mechanism by a second actuation of said manually-controlled means.

36. A photographic shutter comprising mechanism adapted to close the light-admitting aperture thereof, an actuator arranged by one movement to operate said mechanism to open and close the aperture, manually-controlled means for operating said actuator, a member rendered operative on one actuation of said manually-controlled means to arrest said actuator during its operative movement after it has caused the opening of the aperture-closing mechanism and before closing the same, and connections on said manually-controlled means arranged to engage said member on a second actuation of the means and actuate the same to release said actuator, whereby the latter is enabled to continue its motion and close the shutter-closing mechanism.

37. A photographic shutter comprising mechanism adapted to close the light-admitting aperture thereof, a main lever constructed and arranged to engage said mechanism on an operative stroke in one direction and cause the latter to both open and close the aperture, an operating lever under the control of the operator for actuating said main lever, a locking lever having a portion adapted to extend into the path of movement of and engage a portion of said main lever after the latter has actuated the aforesaid mechanism to operate the shutter-aperture, and a projection on said operating lever arranged to engage a portion of said locking lever on a second actuation of the operating lever and move the locking lever out of engagement with the main lever.

38. A photographic shutter comprising mechanism adapted to close the light-admitting aperture thereof, an actuator arranged by one movement to operate said mechanism to open and close the aperture, manually-controlled means for operating said actuator, a member rendered operative on one actuation of said manually-controlled means to arrest said actuator during its operative movement after it has caused the opening of the aperture-closing mechanism and before closing the same, connections on said manually-controlled means arranged to engage said member on a second actuation of the means and actuate the same to release said actuator, and a device adapted to positively hold said member away from the actuator.

39. A photographic shutter comprising mechanism adapted to close the light-admitting aperture thereof, an actuator arranged by one movement to operate said mechanism to open and close the aperture, manually-controlled means for operating said actuator, a member rendered operative on one actuation of said manually-controlled means to arrest said actuator during its operative movement after it has caused the opening of the aperture-closing mechanism and before closing the same, connections on said manually-controlled means arranged to engage said member on a second actuation of the means and actuate the same to release said actuator, and a device adapted to positively hold said member away from the actuator comprising a projection movable into and out of contact with a portion of the said member.

40. A photographic shutter having aperture-closing mechanism an actuator therefor arranged to operate said mechanism to open and close the same, yielding means adapted to engage a portion of said actuator to retard its action in closing the aperture, positive means adapted to rigidly arrest the action of said actuator while the aperture is open, and mechanism for rendering said yielding and positive means inoperative.

41. A photographic shutter having aperture-closing mechanism, an actuator therefor arranged to operate said mechanism to open and close the same, yielding means adapted to engage a portion of said actuator to retard its action in closing the aperture, positive means adapted to rigidly arrest the action of said actuator while the aperture is open, and mechanism for rendering said yielding and positive means inoperative, said mechanism being arranged to throw one of said means out of operative position while the other means is operative.

42. A photographic shutter having aperture-closing mechanism, an actuator therefor arranged to operate said mechanism to open and close the same, yielding means adapted to engage a portion of said actuator to retard its action in closing the aperture, positive means adapted to rigidly arrest the action of said actuator while the aperture is open, and a disk having portions movable into position to engage said yielding means and said positive means respectively to move them out of operative relation with the actuator, the relation of the portions being such that when one of said means is in position to engage the actuator, the other of said means is engaged and held out of operation by said cam.

In testimony whereof I have affixed my signature, in presence of two witnesses.

EDWIN W. PARKER.

Witnesses:
BENJAMIN L. BATTLE,
J. CHAS. JARRELL.